(12) United States Patent
White et al.

(10) Patent No.: US 6,796,578 B2
(45) Date of Patent: Sep. 28, 2004

(54) AIRBAG WITH BAG MOUNTED SENSOR

(75) Inventors: Craig White, Grosse Point, MI (US); John Burdock, St. Clair Shores, MI (US); Ed Clancy, Novi, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 33 days.

(21) Appl. No.: 10/290,401

(22) Filed: Nov. 8, 2002

(65) Prior Publication Data

US 2004/0090053 A1 May 13, 2004

(51) Int. Cl.[7] .................................................. B60R 21/32
(52) U.S. Cl. ....................................... 280/735; 280/739
(58) Field of Search ................................ 280/735, 739; 701/45; B60R 21/01, 21/32

(56) References Cited

U.S. PATENT DOCUMENTS

| | | | |
|---|---|---|---|
| 5,166,679 A | 11/1992 | Vranish et al. | 340/870.37 |
| 5,373,245 A | 12/1994 | Vranish | 324/662 |
| 5,722,686 A * | 3/1998 | Blackburn et al. | 280/735 |
| 5,762,367 A * | 6/1998 | Wolanin | 280/736 |
| 5,770,997 A | 6/1998 | Kleinberg et al. | 340/438 |
| 5,957,490 A * | 9/1999 | Sinnhuber | 280/735 |
| 5,964,478 A * | 10/1999 | Stanley et al. | 280/735 |
| 5,997,033 A * | 12/1999 | Gray et al. | 280/735 |
| 6,020,812 A | 2/2000 | Thompson et al. | 340/438 |
| 6,053,530 A * | 4/2000 | Faigle | 280/735 |
| 6,079,738 A | 6/2000 | Lotito et al. | 280/735 |
| 6,094,610 A | 7/2000 | Steffens, Jr. et al. | 701/45 |
| 6,135,494 A | 10/2000 | Lotito et al. | 280/731 |
| 6,164,694 A * | 12/2000 | Yoshida et al. | 280/736 |
| 6,186,540 B1 * | 2/2001 | Edgren | 280/735 |
| 6,189,928 B1 * | 2/2001 | Sommer et al. | 280/743.2 |
| 6,254,127 B1 | 7/2001 | Breed et al. | 280/735 |
| 6,257,146 B1 * | 7/2001 | Stonebraker | 102/346 |
| 6,308,983 B1 * | 10/2001 | Sinnhuber | 280/735 |
| 6,328,335 B1 * | 12/2001 | Mueller | 280/735 |
| 6,371,517 B1 | 4/2002 | Webber et al. | 280/736 |
| 6,431,596 B1 | 8/2002 | Ryan et al. | 280/739 |
| 6,520,535 B1 * | 2/2003 | Stanley et al. | 280/735 |
| 6,536,799 B2 * | 3/2003 | Sinnhuber et al. | 280/735 |
| 6,685,221 B1 * | 2/2004 | Serban et al. | 280/735 |

FOREIGN PATENT DOCUMENTS

| | | |
|---|---|---|
| DE | 101 24 520 C1 * | 12/2002 |
| GB | 2 319 997 A * | 6/1998 |

OTHER PUBLICATIONS

Driven Shielding Capacitive Proximity Sensor the "Capaciflector" /Description/ Applications/ Retreived from Nasa.gov on Jul. 22, 2002/ Point of Contact: John Vranish, Goddard Space Flight Center (John.Vranish@ccmime.gsfc.nasa.gov).

* cited by examiner

*Primary Examiner*—Ruth Ilan
(74) *Attorney, Agent, or Firm*—Lonnie Drayer; Patrick Stiennon

(57) ABSTRACT

A vehicle occupant position sensor is mounted on the front of an airbag which is deployed toward a vehicle occupant. The sensor comprises a capacitance sensor constructed by rendering portions of the airbag which face the vehicle occupant conductive. The airbag on which the sensor is placed is also constructed to allow venting of the airbag before it is fully deployed. The distance between the sensor and the vehicle occupant is continually determined with respect to the sensor. The output of the capacitive sensor is processed by a control system and is used to predict the interaction between the airbag and the vehicle passenger and to cause the airbag to be vented if that interaction is predicted to be more harmful than beneficial to the vehicle occupant. A system which prevents airbag venting once the airbag is inflated or nearly inflated can also be employed.

9 Claims, 2 Drawing Sheets

AIRBAG WITH BAG MOUNTED SENSOR

FIELD OF THE INVENTION

The present invention relates to airbags and sensors used to control airbag deployment in general and to sensors which monitor the actual deployment sequence in particular.

BACKGROUND OF THE INVENTION

While airbags were originally developed as a passive restraint system, experience has shown that airbags work best in combination with seatbelts and other safety systems. Although airbags contribute to the overall safety of occupants of an automobile, they can present a danger to an occupant who is positioned too close to an airbag when it deploys. This condition, where the occupant is positioned so that airbag deployment might be dangerous, is referred to as the occupant being "out of position". Various systems have been developed to detect an "out of position" occupant. Sensor systems designed to detect the occupant's position often require constant monitoring so that in the event of a crash the occupant's position is known. Sensor systems designed to detect the position of the occupant have been proposed based on ultrasound, optical, or capacitance sensors. Constant monitoring of sensors, which may have high data rates, requires the design of algorithms which can reduce sensor data to a single condition or a limited number of data conditions which are used in an airbag deployment decision to prevent airbag deployment or for a duel stage airbag to select the level of deployment. Maintaining data integrity between the non-crash positional data, and the noisy environment produced by a crash requires additional processor capabilities and algorithm development with associated testing.

DISCUSSION OF THE PRIOR ART

One known approach for determining if a vehicle occupant is too close to the airbag is set forth in U.S. Pat. No. 6,094,610 wherein a plurality of capacitive sensors mounted on the steering wheel are used to detect the distance between the cover of an airbag and the seat occupant. U.S. Pat. No. 6,254,127 describes a variety of approaches for determining the distance between an airbag module or cover, and a vehicle occupant so as to avoid injuring an occupant who is out of position, i.e., too close to the airbag module.

These prior art approaches attempt to determine, based on various sensors, the distance between the airbag and the passenger before the airbag is deployed. In many instances the vehicle occupant will not be too close to the airbag at the time the decision to deploy the airbag is made, but, because of the rate at which the occupant is approaching the airbag the occupant will be too close when the airbag is actually deploying. To handle these situations, more sophisticated sensors and algorithms are needed to attempt to predict the occupant's position when the airbag is actually deployed or nearly completely deployed. In other words, the ideal airbag deployment system functions such that the airbag deploys fully or nearly fully before the occupant engages the airbag. Existing systems inhibit airbag deployment when, based on various sensors and algorithms, it is determined that because of the position of the vehicle occupant the bag is more likely to harm than to benefit the occupant. Successfully creating a sensor and algorithm system is complicated inasmuch as there is usually very little delay between the decision to deploy and the actual deployment. This is so because the maximum benefit from an airbag is achieved by early deployment, and at the same time, more time before deployment maximizes the information available to determine whether deployment is necessary. The desire to maximize effective deployment of the airbags while minimizing unnecessary deployment creates a tension between waiting for more information and deploying immediately. Therefore, once sufficient information is available, deployment typically follows nearly immediately.

Therefore, a system which employs occupant position sensors and algorithms must be able to supply at all times an indication of whether airbag deployment should be inhibited so that the inhibit decision can be applied whenever the airbag deployment decision occurs. This means the sensors and algorithms used to develop the occupant position inhibit signal cannot be optimized to deal with a specific time frame in which the actual deployment decision is made. The end result is that such algorithms may be less accurate than desired because they must predict events relatively far in the future-perhaps tens of milliseconds. One known type of sensor employs a tape which extends between the front of the airbag and a sensor mounted on the airbag housing. The sensor monitors the rate at which tape is withdrawn from the sensor and can detect airbag impact with a vehicle occupant by a decrease in acceleration as measured by the rate of tape withdrawal from the sensor. In the event that the airbag is insufficiently deployed when bag contact is detected, the airbag is vented. Such prior art sensors are limited to detecting the bag interaction with a vehicle occupant, and cannot detect the occupant before the airbag engages the occupant. What is needed is a sensor and a mechanism responsive to the sensor which can effect airbag deployment shortly before the airbag interacts with the vehicle occupant.

SUMMARY OF THE INVENTION

The vehicle occupant position sensor of this invention is mounted on the front of an airbag which is deployed toward a vehicle occupant. The sensor is comprised of one or more capacitance sensors constructed by rendering portions of the airbag which face the vehicle occupant conductive. Such a sensor can be constructed by painting portions of the airbag with conductive paint. Electrical leads are connected to the capacitive sensor using wires or, preferably, conductive traces painted on the airbag, preferably on the inside of the airbag and connecting through the airbag fabric to the capacitive sensor on the outside of the airbag. A sensor is six inches in diameter and can be used to detect an occupant as much as 12 inches away from the sensor. The airbag on which the sensor is placed is also constructed to allow venting of the airbag before it is fully deployed. An electronic system uses the capacitive sensor to continually determine the distance between the sensor and the vehicle occupant, and to determine the velocity and acceleration of the vehicle occupant with respect to the sensor. The output of the capacitive sensor mounted on the airbag may be used by various safety systems within the vehicle, such as belt retractors, to react to the actual motions of the vehicle occupant during a crash. Advantageously, the output of the capacitive sensors as processed by a control system is used to predict the interaction between the airbag and the vehicle passenger and to cause the airbag to be vented if that interaction is predicted to be more harmful than beneficial to the vehicle occupant. Because venting the airbag renders the airbag ineffectual, whether for good or bad effect, a system which prevents airbag venting once the airbag is inflated or nearly inflated is incorporated into the sensor, control system, or venting system.

An alternative embodiment of the invention employs a conductive portion of the bag facing the occupant, together with a conductive portion of the seat on which the occupant sits. When the conductive portion of the bag contacts the occupant, the presence of the occupant is detected directly by means of an electrical circuit which includes the vehicle occupant. Another alternative embodiment employs a sensor which transmits electromagnetic radiation such as microwaves at a target moving with the front of the airbag. The sensor detects when the airbag decelerates due to the bag and target impacting the vehicle occupant. In both the foregoing embodiments, the airbag is vented if the airbag impacts the vehicle occupant too soon to provide a benefit.

It is a feature of the present invention to provide an airbag and deployment system which incorporates an occupant position sensor mounted on the airbag.

It is a further feature of the present invention to provide a mechanism for venting an airbag before the airbag is fully inflated.

It is another feature of the present invention to provide an airbag venting system which cannot be operated once the airbag reaches a certain stage of deployment.

It is a yet further feature of the present invention to provide a means whereby the airbag deployment decision may be inhibited after airbag deployment has begun.

It is a still further feature of the present invention to provide an occupant position sensor mounted on the airbag which provides input to other safety systems within the vehicle.

Further features, and advantages of the invention will be apparent from the following detailed description when taken in conjunction with the accompanying drawings.

DETAILED DESCRIPTION OF THE INVENTION

Figure 1:
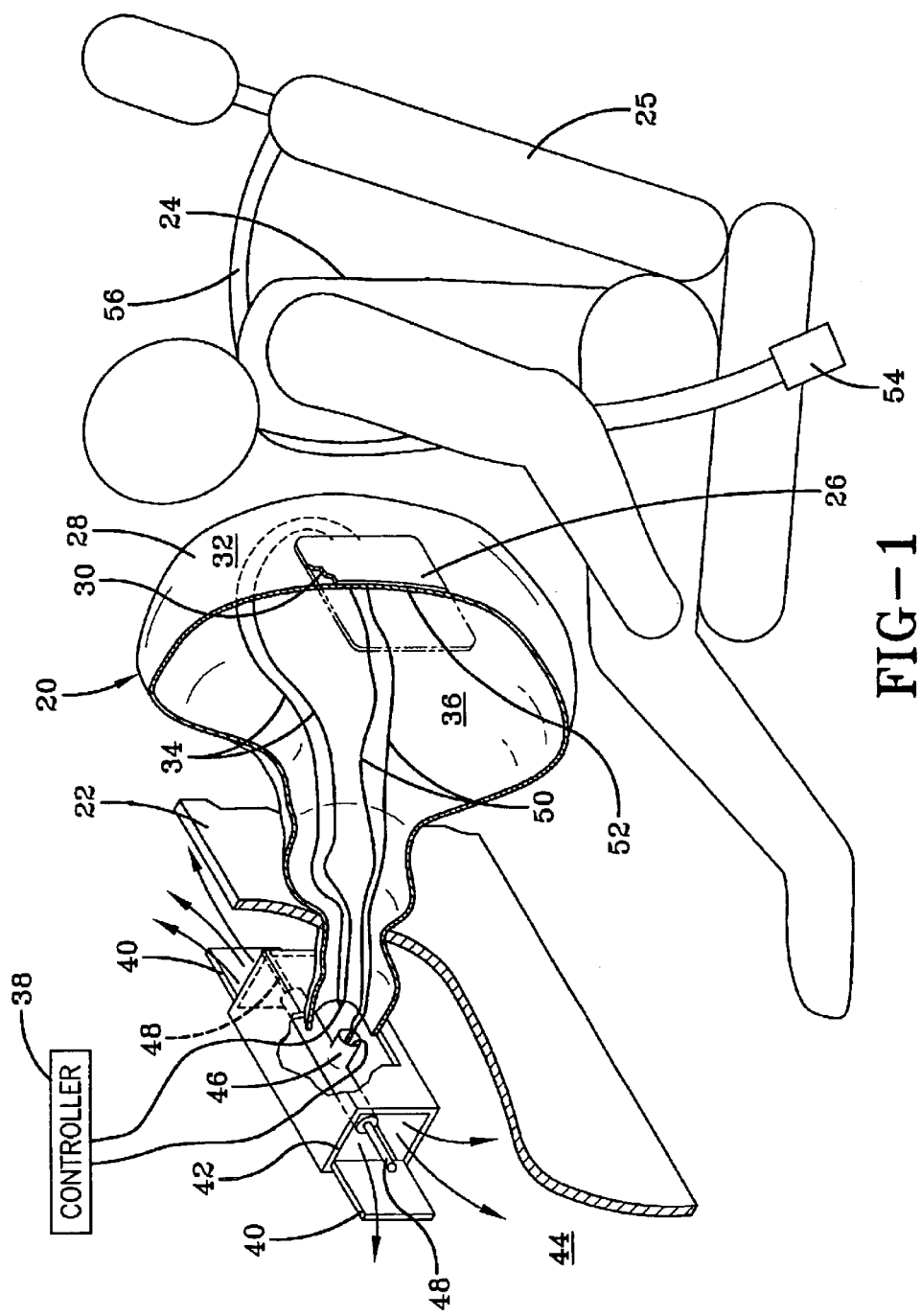
FIG. 1 is a pictorial view partially cut away in section, of the airbag and mounted on the airbag of this invention, as the airbag deploys toward a passenger in a vehicle.
Figure 2:
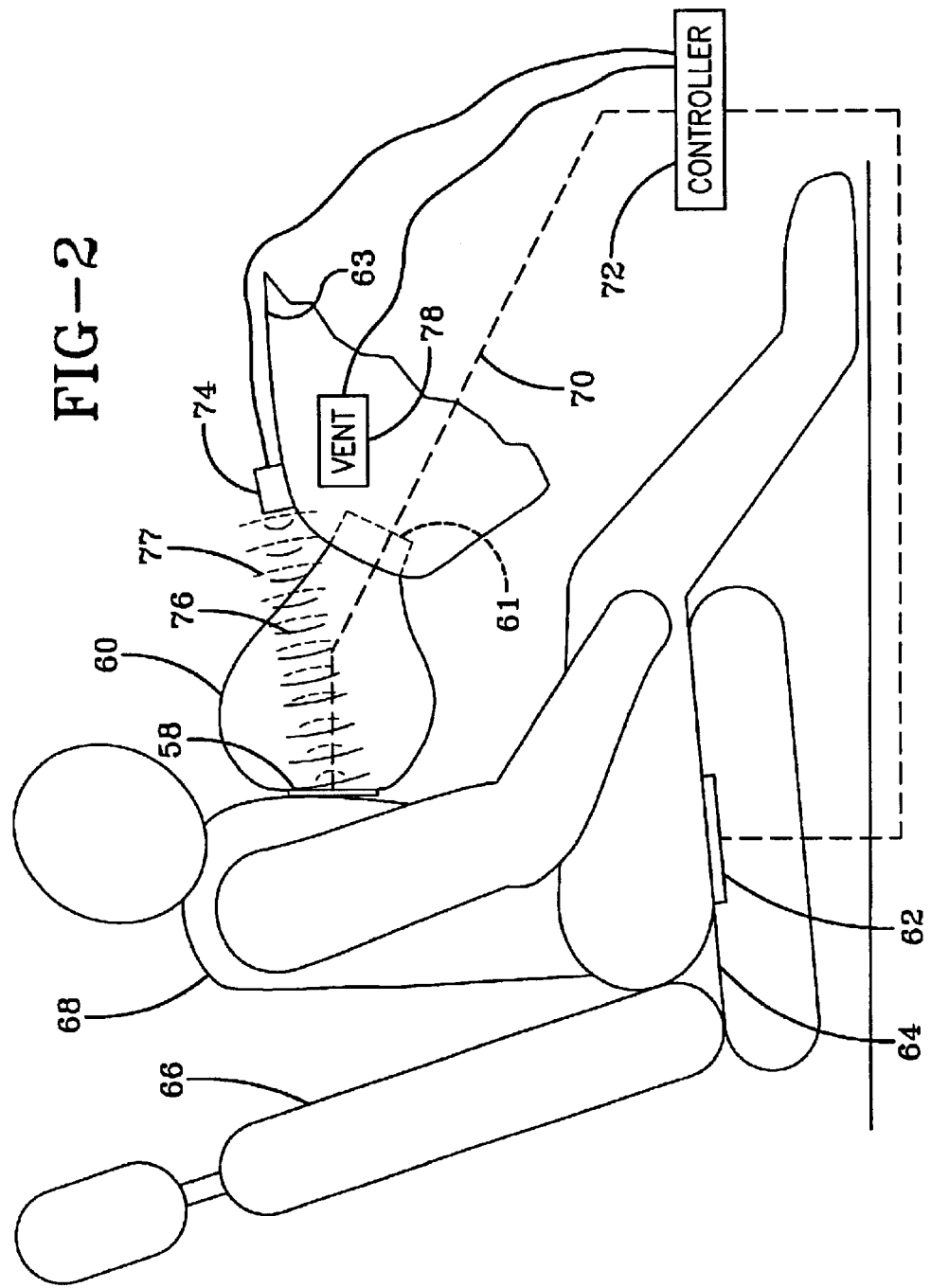
FIG. 2 is a schematic side elevational view of two alternative embodiments of the airbag and airbag sensor of this invention, wherein the mounted sensor is passive.

Referring more particularly to FIGS. 1 and 2, wherein like numbers refer to similar parts an airbag 20 is deployed from a dashboard 22 toward a vehicle passenger 24, seated on a seat 25, as shown in FIG. 1. The airbag 20 has a source of gas i.e., a gas generator or a source of compressed gas, (not shown) mounted to the airbag housing 42 in gas supplying connection to the bag 28 to cause the bag to inflate when a flow of gas is initiated. The airbag 20 has a sensor 26 which is mounted to the bag 28 of the airbag 20. The sensor 28 is a capacitive sensor, of the Capaciflector type, although the design may be simplified because the capacitive sensor 26 is distant from a ground plane and thus the sensor can be constructed without the multiple capacitive layers used to remove the effect of a ground plane on the ability of the sensor to project electrical fields outwardly of the sensor 26. The following patents describe in more detail capacitive proximity sensors, U.S. Pat. No. 5,166,679; 5,770,997; 6,020.812; 6,079,738; 6,094.610; and 6,135,494 and all of these U.S Patents are incorporated by reference herein.

The capacitive sensor 26 is constructed by creating a conductive portion 30 of the bag 28, by painting the front surface 32 which faces the passenger 24 with one or more layers of conductive copper paint. The airbags are typically constructed of a low abrasive nylon fabric which is relatively impermeable. However, the bag material is sufficiently permeable that electrical connection between the one or more copper plates and the conductive portion 30 can be achieved through the bag material. Electrical lines 34 are formed along the inside surface 36 of the bag 28 utilizing silver paint. The electrical lines 34 connects to a controller 38, which supplies the driving power, and collects data from the sensor 26. A Layer of fabric or other coating may be placed over the copper paint to reduce abrasiveness of the copper layer.

In prior art designs which attempt to gather and make use of information concerning the position of the vehicle occupant relative to the airbag, the information gathered has been used to affect the decision to deploy an airbag and possibly the amount of force with which to deploy the airbag where a two-stage or a variable airbag is used. The airbag 20, together with the sensor 26, and the controller 38, allows the decision to deploy an airbag to be effectively reversed by venting the airbag before it has reached full deployment. An airbag is designed to rapidly fill with gas at a designed pressure which will absorb the impact of the vehicle passenger as the passenger accelerates into the bag. The airbag is designed to vent in a controlled manner to produce a controlled acceleration. The airbag 20 has, in addition to the standard vents (not shown) usually incorporated into the bag itself, large squib activated vents 40 formed in the structure of the airbag housing 42 which allow the gases being used to inflate the airbag to vent from the airbag housing 42 to the area 44 behind a dashboard 22.

The squib activated vents 40 are activated by a squib and gas generator 46 which operates pistons 48 which operate the vents 40. When the vents 40 are opened, however, the airbag loses all effectiveness. Therefore it is desirable that, if the airbag has completely inflated or nearly inflated before coming into contact with the occupant 24, the squib and gas generator 46 be disabled. This can be accomplished by a pair of wires 50 which extend between the inside front surface 52 of the bag 28. The wires 50 are arranged so that when the bag 28 is ninety percent deployed the wires 50 tear loose from the bag inside front surface 52 creating an electrical short, which disables the squib 46 and prevents the operation of the vents 40.

Because the sensor 26 generates an electrical field which extends outwardly of the airbag 28, it can detect the presence and distance of the occupant 24 as the sensor approaches the occupant. From the distance over time information the acceleration which the occupant is undergoing can be developed. The controller 38 can send information to a seat belt retractor 54, which anchors one end of a seat belt 56, or other safety systems to take action based on the data derived from the bag mounted sensor 26.

An alternative airbag mounted sensor 58, which again may be comprised of a metallized portion of the airbag 60, is shown in FIG. 2. The airbag 60 extends from an airbag housing 61 which is mounted behind the dashboard 63 or instrument panel. In this embodiment, a circuit is formed between a conductive sensor 62 mounted on the cushion 64 of the car seat 66 on which a passenger 68 is placed in contact when occupying the seat 66. When the sensor 58 mounted on the airbag 60 contacts the seat occupant 68, an electrical circuit 70 is completed and detected by a controller 72. The controller 72 can use a timer to determine if the airbag has reached full deployment or nearly full deployment before contact with the seat occupant 68 is detected. If the airbag has deployed completely or nearly completely, the controller takes no action. If, on the other hand, the controller detects that the bag 60 has made contact with the seat occupant 68 at a time corresponding to a stage of airbag deployment, which may represent a hazard to the seat occupant 68, the airbag 60 may be vented using a vent system 78 similar to the one shown in FIG. 1.

A further embodiment employs a microwave transceiver sensor 74 which reflects a beam of microwaves 76 off the metallized portion forming the sensor 58. By processing reflected microwaves 77 for time of flight, and/or Doppler shift information, the distance and velocity of the sensor 58 can be determined and the acceleration of the sensor derived. The controller 72 determines the various derivatives of distance, producing distance, velocity, acceleration, and perhaps higher order derivatives. A change in acceleration of the sensor 58, which departs from the acceleration profile of the sensor during an unobstructed deployment, allows detection of airbag impact with the passenger 68. If the airbag 60 impacts with the passenger 68 before the airbag 60 has reached some minimum deployment amount, for example ninety percent, the controller 72 can command an airbag vent system 78 similar to that shown in FIG. 1 to vent the airbag 60.

It should be understood that the microwave sensor 74 can be replaced by a sensor employing ultrasonic, radio frequency, magnetic, electrostatic, infrared or optical tracking of the sensor 58, which itself does not necessarily need to be a metallization of the interior or exterior surface of the airbag. The sensor 58 could be passive or active so as to cooperate with the signal transceiver 74. It is also possible that the signal transceiver and/or the sensor 58 could be located internal to the bag 60.

It should be understood that the sensor 26 could be constructed by any means which would render a portion of the front surface 32 conductive, for example painting with silver or aluminum based paint, weaving a portion of the bag with conductive fibers, which may be metallized or which might be conductive organic fibers. Alternatively, the conductive portion 30 might be created by vapor deposition or flame spraying a conductive material onto the bag 28. Other approaches would include laminating, bonding, or stitching a conductive sensor onto the front surface 32 of the bag 28.

It should further be understood that the function provided by the wires 50 which break when the airbag reaches a selected level of inflation, for example ninety percent, could be accomplished by other means. For example, the microwave transceiver 74 shown in FIG. 2, or one of the variations herein previously described could be used to detect the extent to which an airbag is deployed.

It should also be understood that where the airbag is shown and described as a passenger side airbag deploying from the dashboard 22, 63, the sensor systems disclosed herein could be used with a driver side airbag or with any airbag which is mounted to a vehicle.

It should be understood that the sensor 26 and controller 38 could be used with a two stage or variable inflation airbag. Likewise, the sensor 58 and the controller 72 with the sensor 62, or alternatively the sensor 58, the transceiver 74, and controller 72 could also be used with a two stage or variable inflation airbag. And wherein the preferred embodiment of the vents 40 or 78 will result in complete venting of the airbag, a vent system which was only partial such that the airbag retained some functionality is also possible.

It is understood that the invention is not limited to the particular construction and arrangement of parts herein illustrated and described, but embraces all such modified forms thereof as come within the scope of the following claims.

We claim:

1. An airbag system comprising:

an airbag housing;

an airbag mounted to the airbag housing, and having an occupant facing portion which, when the airbag is inflated, faces an occupant position;

a source of gas mounted to the airbags housing in gas supplying connection to the airbag to cause the airbag to inflate when a flow of gas is initiated;

a sensor for detecting a vehicle occupant, the sensor being mounted to the occupant facing potion of the airbag, so that when the airbag is deployed the sensor moves with the airbag toward the occupant;

a controller in electrical signal receiving relation to the sensor to detect the sensor interaction with a vehicle occupant said controller being connected in controlling relation to a vent mounted to the airbag housing, the vent being operable in response to a command from the controller to allow an escape of gas from airbag; and a means for detecting at least one stage of airbag inflation, said means being operatively connected to the vent to inhibit opening of the vent when the at least one stage of airbag inflation is detected.

2. The airbag system of claim 1 wherein the sensor comprises a conductive area of the occupant facing portion of the airbag.

3. The airbag system of claim 1 wherein the sensor comprises a Capaciflector sensor.

4. The airbag system of claim 1 further comprising electrical traces formed on a surface of the airbag, wherein electrical signals from the sensor are conducted along the electrical traces.

5. The airbag system of claim 1 wherein the means for detecting at least one stage of the airbag Inflation is a wire connected to the occupant facing portion of the airbag.

6. The airbag system of claim 2 further comprising an electrical contact forming part of a vehicle seat, the electrical contact and the sensor comprising the conductive area being connected to an electrical circuit which provides an output when both the electrical contact forming part of the vehicle seat and the sensor comprising the conductive area are electrically connected by a vehicle passenger.

7. A method of controlling deployment of an airbag which is deployed toward a vehicle occupant, the method comprising the steps of:

initiating the deployment of an airbag toward a vehicle occupant;

while the airbag is deploying, repeatedly determining a multiplicity of times the distance between a portion of the airbag which faces a vehicle occupant and the vehicle occupant with a sensor mounted on the portion of the airbag which faces the vehicle occupant;

processing data from the sensor using a controller in data receiving relation with the sensor to calculate at least one derivative of distance with respect to time of the distance between the portion of the airbag and the vehicle occupant; and controlling a vent connected to the airbag with the controller to open the vent if the airbag is predicted by the controller to impact the vehicle occupant before the airbag has reached a selected percentage of full deployment.

8. The method of claim 7 further comprising the step of monitoring whether the airbag has reached the selected percentage of full deployment, and on condition that the selected percentage of full deployment has been achieved, inhibiting the opening of the vent.

9. The method of claim 7 wherein the sensor mounted on the portion of the airbag facing the vehicle occupant is a capacitor, and wherein the step of determining the distance between the portion of the airbag which faces a vehicle occupant and the vehicle occupant is performed by determining an electrical value associated with the capacitor.

* * * * *